United States Patent
Hsieh et al.

(10) Patent No.: US 7,719,623 B2
(45) Date of Patent: May 18, 2010

(54) LIQUID CRYSTAL DISPLAY PANEL AND MANUFACTURING METHOD THEREOF

(75) Inventors: Chih-Yung Hsieh, Tainan County (TW); Chien-Hong Chen, Tainan County (TW)

(73) Assignee: Chi Mei Optoelectronics Corp., Tainan County (TW)

( * ) Notice: Subject to any disclaimer, the term of this patent is extended or adjusted under 35 U.S.C. 154(b) by 38 days.

(21) Appl. No.: 12/032,447

(22) Filed: Feb. 15, 2008

(65) Prior Publication Data

US 2008/0198285 A1      Aug. 21, 2008

(30) Foreign Application Priority Data

Feb. 16, 2007    (TW) ............................... 96106311 A

(51) Int. Cl.
*G02F 1/1343*    (2006.01)

(52) U.S. Cl. .................. 349/39; 349/139; 349/144

(58) Field of Classification Search ................ None
See application file for complete search history.

(56) References Cited

U.S. PATENT DOCUMENTS

| | | | |
|---|---|---|---|
| 2006/0215066 A1* | 9/2006 | Ueda et al. | 349/38 |
| 2006/0290827 A1* | 12/2006 | Kihara et al. | 349/38 |
| 2008/0129907 A1* | 6/2008 | Jun et al. | 349/38 |

* cited by examiner

*Primary Examiner*—Omar Rojas

(57) ABSTRACT

A liquid crystal display (LCD) panel includes pixels arranged in matrix, and first and second scan lines and a storage capacitance line. Each pixel has a first sub-pixel, which is disposed between the first and second scan lines, and first to third thin-film transistors (TFTs) and a pixel electrode divided into first and second regions. The first TFT is electrically connected to the first scan line and the first region. The second TFT is electrically connected to the first scan line and the second region. The third TFT is electrically connected to the second scan line and the second region. The storage capacitance line is electrically connected to the third TFT. A distance between the storage capacitance line and the first scan line is longer than that between the storage capacitance line and the second scan line.

18 Claims, 14 Drawing Sheets

LIQUID CRYSTAL DISPLAY PANEL AND MANUFACTURING METHOD THEREOF

This application claims the benefit of Taiwan application Serial No. 096106311, filed Feb. 16, 2007, the entirety of which is incorporated herein by reference.

BACKGROUND

1. Technical Field

The disclosure relates in general to a display panel and a manufacturing method thereof, and, in particular, to a liquid crystal display (LCD) panel and a manufacturing method thereof.

2. Related Art

The LCD panel is one of increasingly popular display panels and advantageously has high resolution, light weight, thin thickness and low power consumption. However, the current LCD panel still has some technological problems to be solved. For example, the problem of wide view angle exists, in which the user sees the displayed image with the different gray-scale levels and brightness when he or she is watching the image from the front or at an angle from either right or left side of the display. Usually, the brightness of the image viewed by the user from the front of the display is higher than that viewed by the user from either side of the display. Therefore, the frames viewed on the LCD apparatus at different angles have different brightness, which causes different color mixing results. Thus, the phenomena of color shift and color de-saturation tend to occur.

Referring to FIGS. 1 and 2, a sub-pixel structure 1 of a conventional multi-domain vertically aligned (MVA) LCD panel includes at least one TFT (Thin Film Transistor) T, a storage capacitance line 11, a sub-pixel electrode 12, a liquid crystal layer 13 and a common electrode 14. The common electrode 14 is formed on a color filter substrate 16. The sub-pixel electrode 12 is formed on a dielectric layer 17 of a TFT substrate 15. The liquid crystal layer 13 is accommodated between the sub-pixel electrode 12 and the common electrode 14. The sub-pixel electrode 12 is disposed between two neighboring scan lines $SL_n$ and $SL_{n+1}$, and the sub-pixel electrode 12 has a plurality of slits 12a so that the sub-pixel electrode 12 is formed with a pattern. The TFT T controls the operation of the sub-pixel structure 1, and a storage capacitor is formed between the storage capacitance line 11 and the sub-pixel electrode 12.

As mentioned hereinabove, the slits 12a or alignment protrusions 14a are arranged on the TFT substrate 15 or the color filter substrate 16 in the MVA LCD panel so that liquid crystal molecules are arranged in multiple directions and several alignment domains can be obtained to improve the problem of wide view angle.

Recently, another technology has been proposed in order to improve the color shift problem associated with the wide view angle problem more effectively. As shown in FIG. 2, the sub-pixel electrode 12 is divided into a first region I and a second region II in order to display different brightness ratios with respect to different gray-scale levels. In order to achieve this effect, in general, it is possible to turn on a third TFT $T_3$, when the next scan line $SL_{n+1}$ is being enabled, to conduct charges on an auxiliary capacitor, which is defined by the corresponding arrangement of an extra interconnection 11a of the storage capacitance line 11 and an electrode E having a potential equal to that of a source of the third TFT $T_3$, to the second region II of the sub-pixel electrode 12 so that the brightness difference between the second region II and the first region I is kept constant to prevent the problem of color shift from occurring.

FIG. 3 shows an equivalent circuit diagram of the sub-pixel structure 1. The liquid crystal capacitor $C_{lc}(A)$ is defined by the corresponding arrangement of the first region I (e.g., a bright region) of the sub-pixel electrode 12 and the common electrode 14. The liquid crystal capacitor $C_{lc}(B)$ is defined by the corresponding arrangement of the second region II (e.g., a dark region) of the sub-pixel electrode 12 and the common electrode 14. The storage capacitor $C_{st}(A)$ is defined by the corresponding arrangement of the storage capacitance line 11 and a capacitor electrode 112, which is electrically connected to the first region of the sub-pixel electrode 12 through a via. The storage capacitor $C_{st(B)}$ is defined by the corresponding arrangement of the storage capacitance line 11 and a capacitor electrode 111, which is electrically connected to the second region of the sub-pixel electrode 12 through a via. The auxiliary capacitor $C_S$ is defined by the corresponding arrangement of the extra interconnection 11a of the storage capacitance line 11 and the electrode E having the potential equal to that of the source of the third TFT $T_3$. The first region I and the second region II of the sub-pixel electrode 12 are respectively disposed corresponding to the common electrode 14, and electrically connected to a data line $DL_n$ and the scan line $SL_n$ opposite to the data line $DL_n$ through a first TFT $T_1$ and a second TFT $T_2$ opposite to the first TFT $T_1$. The second region II of the sub-pixel electrode 12 is electrically connected to the next scan line $SL_{n+1}$ and the auxiliary capacitor through the corresponding third TFT $T_3$.

FIG. 4 is a schematic time chart showing the operation of the scan lines $SL_n$ and $SL_{n+1}$ as well as nodes $V_{P1}$ and $V_{P2}$ in FIG. 3. First, when the scan line $SL_n$ inputs a signal to the sub-pixel electrode 12, the first TFT $T_1$ and the second TFT $T_2$ turn on, and sub-pixel data of positive polarity is inputted through the data line DL so that the potentials of the nodes $V_{P1}$ and $V_{P2}$ are equal to $V_1$. When the scan line $SL_n$ stops inputting the signal to the sub-pixel electrode 12, the first TFT $T_1$ and the second TFT $T_2$ instantaneously turn off. At this time, the nodes $V_{P1}$ and $V_{P2}$ encounter different feed-through effects due to the influence the parasitic capacitances between the gates and the drains of the TFTs $T_1$ and $T_2$. Thus, the potentials of the nodes $V_{P1}$ and $V_{P2}$ are different from each other and are respectively $V_2$ and $V_{21}$, and the level difference therebetween relative to a common voltage $V_{com}$ is about $(V_2-V_{21})$. Next, when the scan line $SL_{n+1}$ inputs the signal to the sub-pixel electrode 12, the previous frame is influenced by the dot inversion factor. So, when the third TFT $T_3$ turns on, the charges stored in the storage capacitor $C_{st(B)}$ neutralize the auxiliary capacitor $C_S$ and the voltage level of the node $V_{P2}$ is changed to $V_3$ while the voltage level of the node $V_{P1}$ is still $V_2$. When the scan line $SL_{n+1}$ stops inputting the signal, the potentials of the nodes $V_{P1}$ and $V_{P2}$ are respectively kept at $V_2$ and $V_3$. When the next frame time comes, the scan line $SL_n$ again inputs the signal to turn on the first TFT $T_1$ and the second TFT $T_2$, and inputs the sub-pixel data of negative polarity through the data line DL so that the potentials of the nodes $V_{P1}$ and $V_{P2}$ are simultaneously made equal to $V_4$. When the scan line $SL_n$ stops inputting the signal, the first TFT $T_1$ and the second TFT $T_2$ instantaneously turn off, and the potentials of the nodes $V_{P1}$ and $V_{P2}$ are influenced by different feed-through effects and are thus respectively equal to $V_5$ and $V_{51}$. So, the level difference therebetween relative to the common voltage $V_{com}$ is about $(V_5-V_{51})$. Next, the scan line $SL_{n+1}$ inputs the signal to turn on the third TFT $T_3$ so that the charges of the previous frame with the positive polarity stored in the storage capacitor $C_{st(B)}$ are transferred to the auxiliary capacitor $C_S$, and the voltage level of the node $V_{P2}$ is changed to $V_6$. Meanwhile, the voltage level of the node $V_{P1}$ is still equal to $V_5$. When the scan line $SL_{n+1}$ stops inputting the signal, the potentials of the nodes $V_{P1}$ and $V_{P2}$ are respectively equal to $V_5$ and $V_6$.

However, no matter which method is utilized, the storage capacitance line 11 in the sub-pixel structure 1 is disposed at a middle position of the sub-pixel electrode 12. When the extra interconnection 11a has to be additionally formed through the storage capacitance line 11 in order to adjust the capacitance, the difficulty and the loading of interconnection of the storage capacitance line 11 will be increased, and the aperture ratio will be decreased. In addition, when the sub-pixel electrode 12 is divided into the first region (bright region) I and the second region (dark region) II and if the bright region I and the dark region II are influenced by different feed-through effects, the signals displayed by two regions of the sub-pixel structure 1 have different levels relative to the signal center point $V_{com}$. Thus, the signal may have the problem of flickering among different frames, and a retained image caused by the polarization of the liquid crystal molecules cannot disappear after a long period of time.

Therefore, there is a need to provide a LCD panel and a manufacturing method thereof, wherein the difficulty of interconnection can be simplified, the influence of the low gray-scale region on the display property can be decreased, and the phenomenon of color shift can be improved.

SUMMARY

In an embodiment, the invention discloses a liquid crystal display (LCD) panel, comprising a thin film transistor substrate, wherein the thin film transistor substrate further comprises: a first scan line disposed on the thin film transistor substrate; a second scan line disposed on the thin film transistor substrate and arranged in parallel to the first scan line; and a plurality of pixels. Each of the pixels comprises a first sub-pixel disposed between the first scan line and the second scan line, and has a first thin-film transistor (TFT), a second TFT, a third TFT and a pixel electrode. The pixel electrode is divided into a first region and a second region for displaying different signals. The first TFT is electrically connected to the first scan line via a first gate and connected to the first region by a first drain electrode. The second TFT is electrically connected to the first scan line via a second gate and connected to the second region by a second drain electrode. The third TFT is electrically connected to the second scan line via a third gate and connected to the second region by a third drain electrode. A data line connects a first source electrode of the first TFT and a second source electrode of the second TFT. A storage capacitance line is arranged in parallel to the first scan line and the second scan line and electrically connected to the third TFT. A distance between the storage capacitance line and the first scan line is longer than a distance between the storage capacitance line and the second scan line.

In another embodiment, the invention further discloses a liquid crystal display (LCD) panel, comprising a thin film transistor substrate, wherein the thin film transistor substrate further comprises: a first scan line disposed on the thin film transistor substrate; a second scan line disposed on the thin film transistor substrate; and a plurality of pixels. Each of the pixels comprises a first sub-pixel, which is disposed between the first scan line and the second scan line and has a first thin-film transistor (TFT), a second TFT, a third TFT and a pixel electrode. The pixel electrode is divided into a first region and a second region for displaying different signals. The first TFT is electrically connected via a first gate to the first scan line and connected to the first region by a first drain electrode. The second TFT is electrically connected via a second gate to the first scan line and connected to the second region by a second drain electrode. The third TFT is electrically connected via a third gate to the second scan line and connected to the second region by a third drain electrode. A data line connects a first source electrode of the first TFT and a second source electrode of the second TFT. A first overlapped area between (a) the first scan line and (b) a first conductive pattern which is connected to the first drain electrode and is the first region of the pixel electrode is smaller than a second overlapped area between (c) the first scan line and (d) a second conductive pattern which is connected to the second drain electrode and is the second region of the pixel electrode. Both the first overlapped area and said second overlapped area are not zero.

In yet another embodiment, the invention discloses a method of manufacturing a liquid crystal display (LCD) panel, the method comprising steps of: forming a first scan line and a second scan line on a thin-film transistor (TFT) substrate; forming a first TFT and a second TFT having gates connected to and first and second drains overlapping the first scan line; forming a third TFT having a gate connected to the second scan line; forming a data line on the TFT substrate to connect sources of the first and second TFTs; forming a pixel electrode on the TFT substrate and between the first scan line and the second scan line; connecting the TFT substrate to an opposing substrate; and forming a liquid crystal layer between the TFT substrate and the opposing substrate. The pixel electrode is divided into a first region and a second region for displaying different signals. The first drain of the first TFT is electrically connected to the first region. The second drain of the second TFT is electrically connected to the second region. A third drain of the third TFT is electrically connected to the second region. A first non-zero overlapped area, where said first scan line overlaps said first drain and said first region, is formed to be smaller than a second non-zero overlapped area, where said first scan line overlaps said second drain and said second region.

Additional aspects and advantages of the disclosed embodiments are set forth in part in the description which follows, and in part are apparent from the description, or may be learned by practice of the disclosed embodiments. The aspects and advantages of the disclosed embodiments may also be realized and attained by means of the instrumentalities and combinations particularly pointed out in the appended claims.

BRIEF DESCRIPTION OF THE DRAWINGS

The disclosed embodiments of the invention will become more fully understood from the detailed description and accompanying drawings, which are given for illustration only, and thus are not limitative of the present invention, and wherein.

DETAILED DESCRIPTION OF EMBODIMENTS

Embodiments of the present invention will be apparent from the following detailed description, with reference to the accompanying drawings, wherein the same references relate to the same elements.

It is to be specified first that a liquid crystal display (LCD) apparatus 2 in this embodiment is, without being limited to, a multi-domain vertically aligned (MVA) liquid crystal display apparatus. Also, the LCD apparatus 2 may also be a twisted-nematic LCD apparatus, an optically compensated bend (CB) LCD apparatus, an axisymmetric aligned (ASM) LCD apparatus or an in-plane switching (IPS) LCD apparatus.

Figure 1:
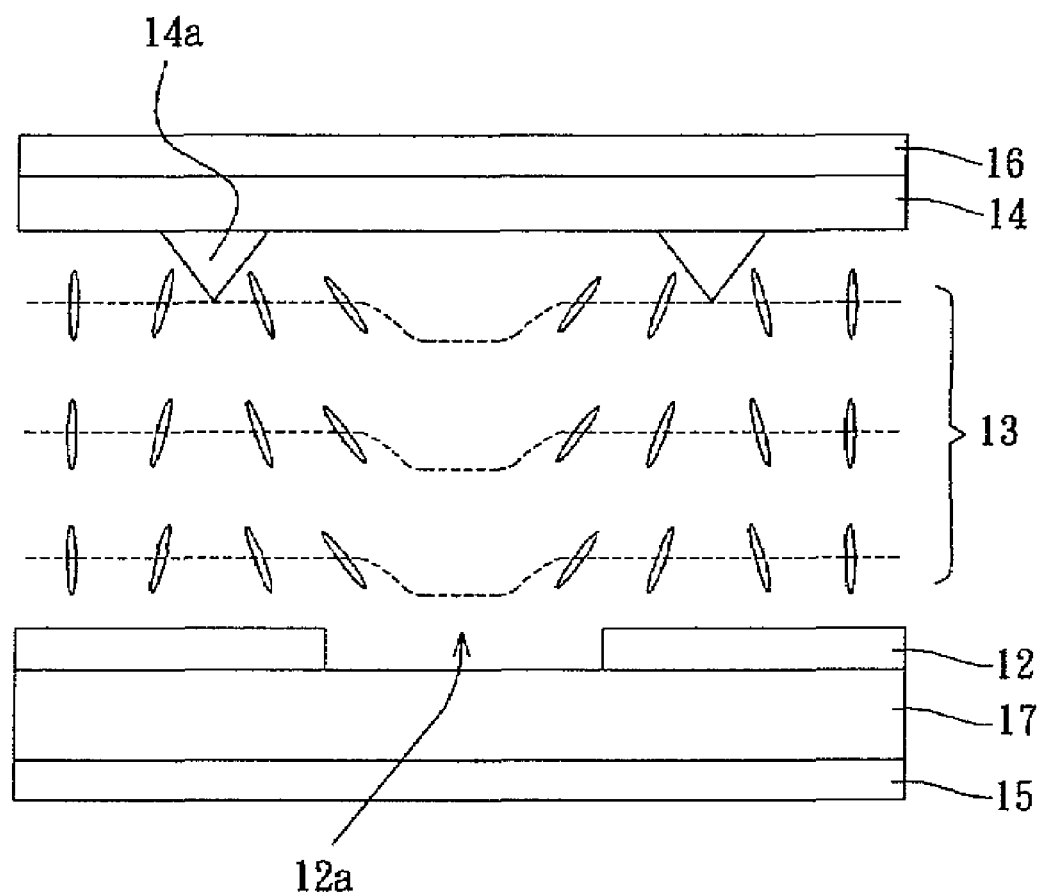
FIG. 1 is a side view showing a sub-pixel structure of a conventional multi-domain vertically aligned (MVA) LCD panel.
Figure 2:
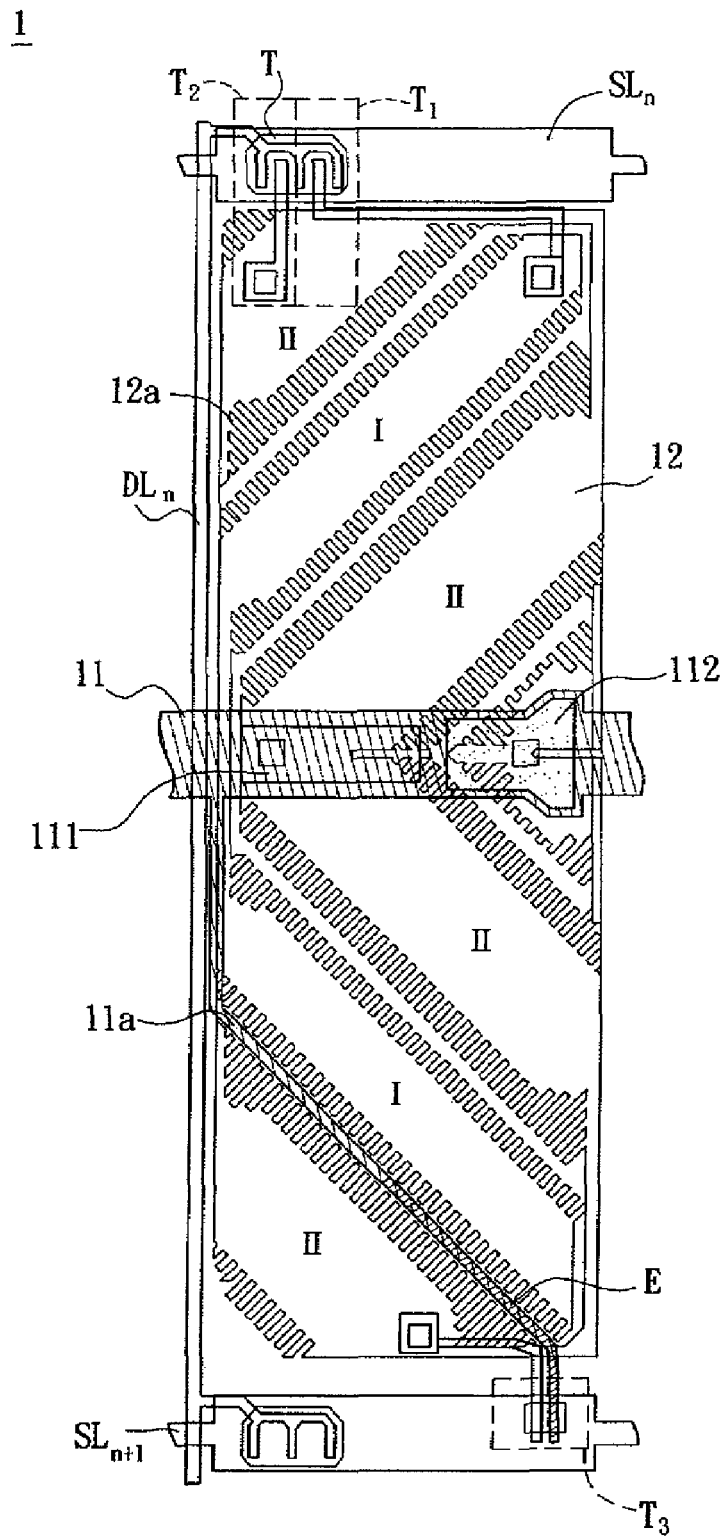
FIG. 2 is a plan-view schematic illustration showing the sub-pixel structure of a conventional MVA LCD panel.
Figure 3:
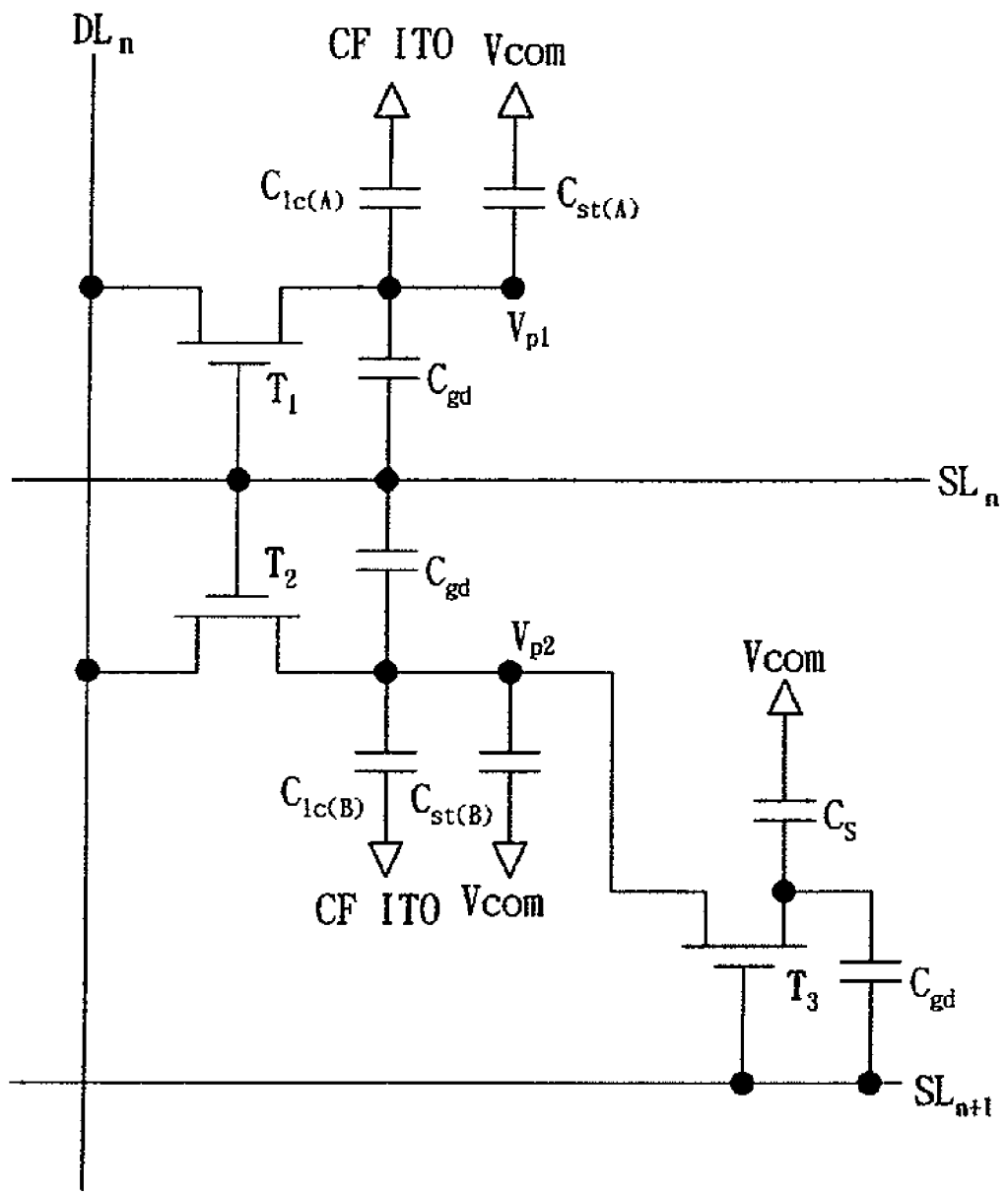
FIG. 3 is an equivalent circuit diagram of the sub-pixel structure of the conventional MVA LCD panel.
Figure 4:
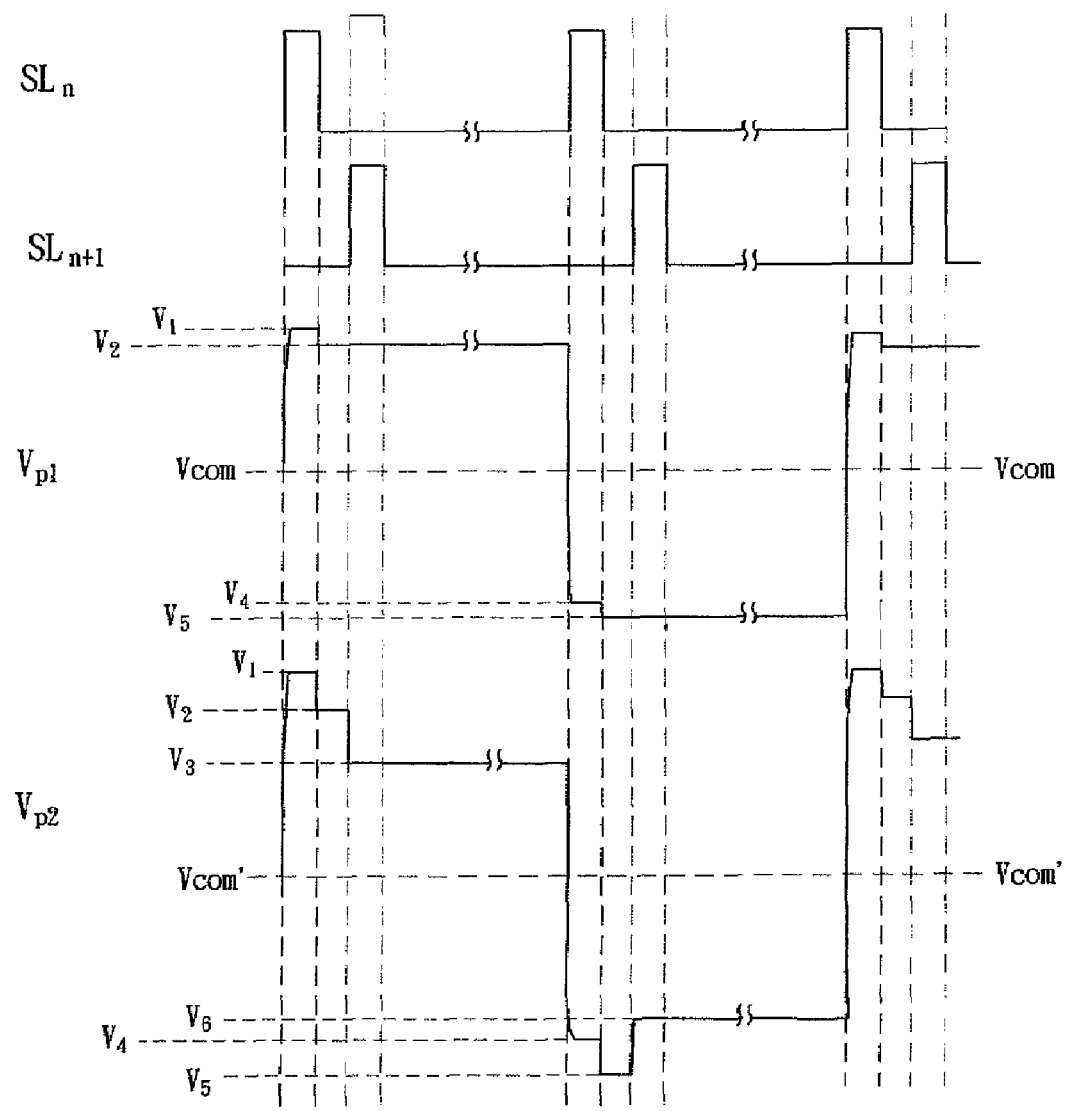
FIG. 4 is an operational timing chart of the sub-pixel structure of the conventional MVA LCD panel.
Figure 5:
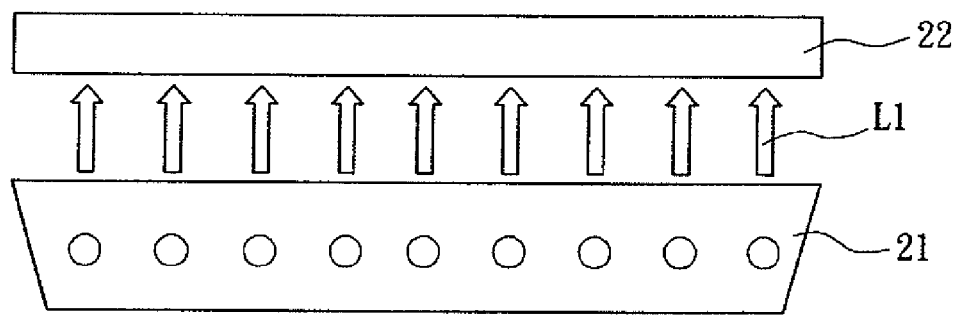
FIG. 5 is a schematic illustration showing a LCD panel according to an embodiment of the invention.

FIG. 5 is a schematic illustration showing a structure of the LCD apparatus 2 according to an embodiment of the invention. Referring to FIG. 5, the LCD apparatus 2 includes a backlight module 21 and an LCD panel 22. The backlight module 21 is disposed adjacent the LCD panel 22 and outputs light $L_1$ passing through the LCD panel 22. In this embodiment, the backlight module 21 is, without being limited to, a bottom lighting backlight module, and may also be an edge lighting backlight module. A backlight source of the backlight module 21 may be selected from a cold cathode fluorescent lamp (CCFL), a light emitting diode (LED), an organic electro-luminescent device (OELD) or a field emissive device (FED).

In addition, the LCD panel 22 has a thin-film transistor (TFT) substrate (not shown), an opposing substrate (e.g., a color filter substrate) (not shown) and a liquid crystal layer (not shown). The TFT substrate is disposed opposite to the opposing substrate, and the liquid crystal layer is disposed between the TFT substrate and the opposing substrate. The TFT substrate has a plurality of data lines, a plurality of scan lines, a plurality of pixels and a plurality of storage capacitance lines. Each scan line is arranged in parallel with the storage capacitance lines, and the pixels are arranged in matrix. Herein, each pixel includes a sub-pixel disposed between two neighboring scan lines.

Figure 6:
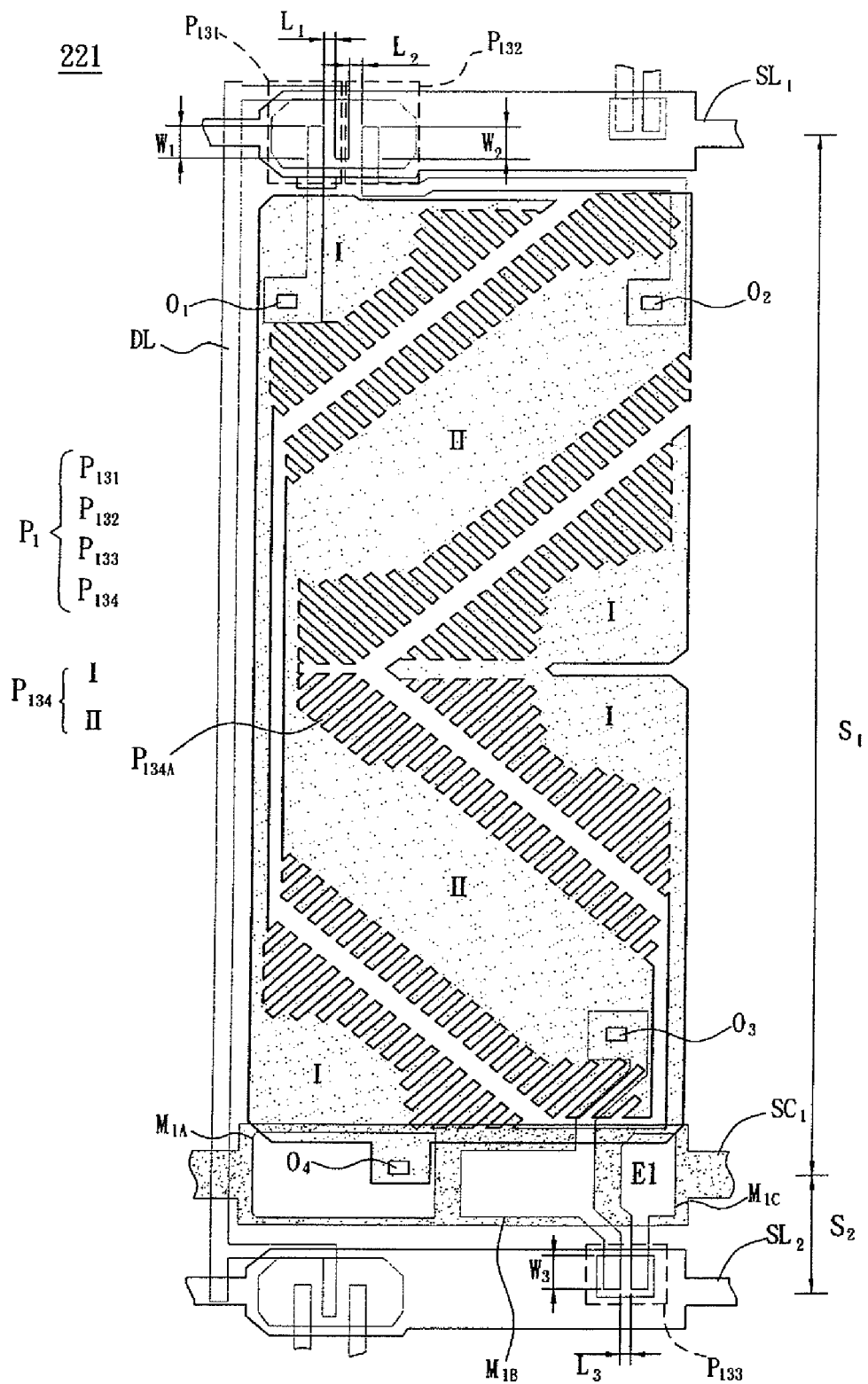
FIG. 6 is a plan-view schematic illustration showing a sub-pixel structure of a TFT substrate of the LCD panel according to the embodiment of the invention.
Figure 7:
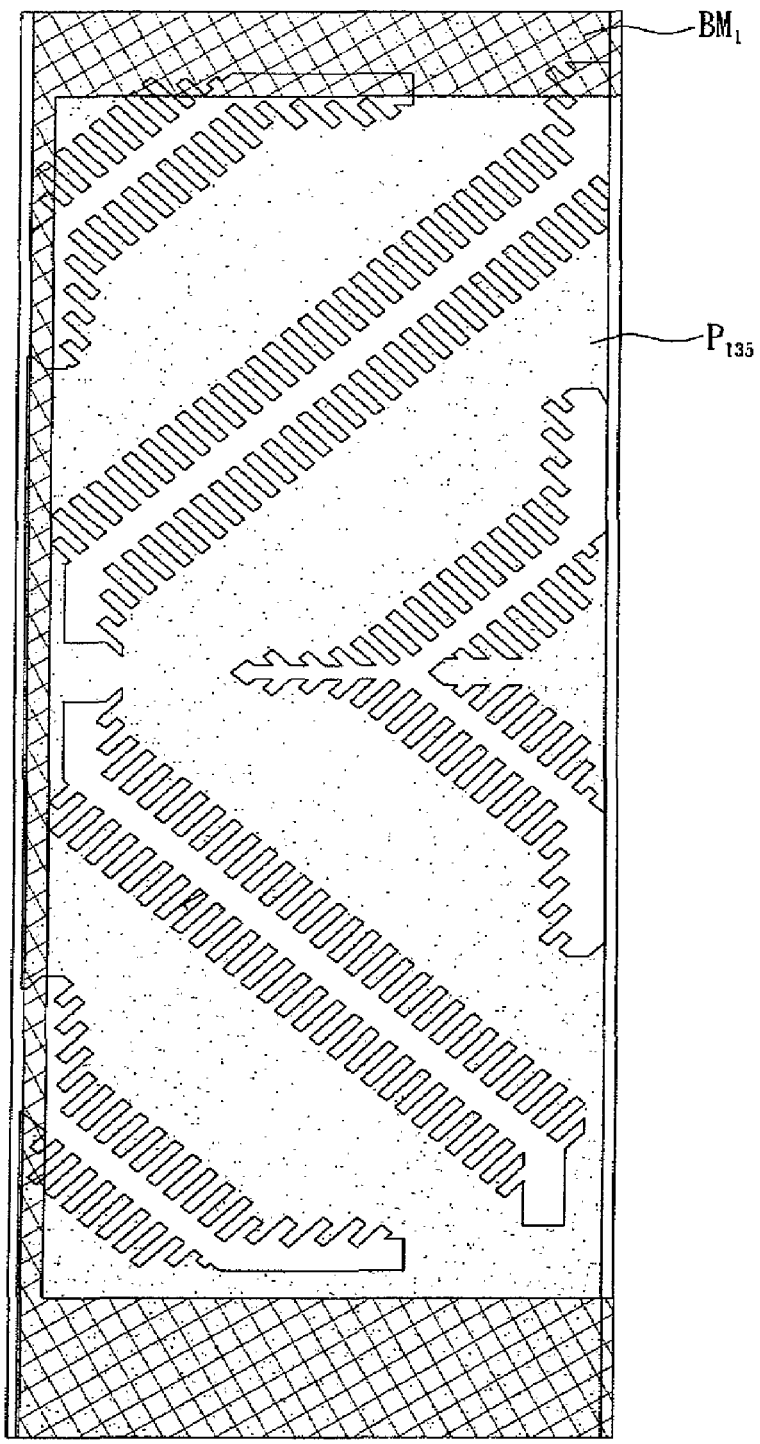
FIG. 7 is a plan-view schematic illustration showing a sub-pixel structure of an opposing substrate of the LCD panel according to the embodiment of the invention.

FIGS. 6 and 7 are plan-view schematic illustrations showing sub-pixel structures 221 and 222 of the TFT substrate and the opposing substrate, respectively. Referring to FIGS. 6 and 7, the sub-pixel structure 221 of the TFT substrate includes a first sub-pixel $P_1$, a data line DL, a first scan line $SL_1$, a second scan line $SL_2$ and a storage capacitance line $SC_1$ (see FIG. 6). The sub-pixel structure 222 of the opposing substrate includes a common electrode $P_{135}$, as shown in FIG. 7. In this embodiment, the first sub-pixel $P_1$ may be red, green, blue or other-colored sub-pixels in a full-color pixel.

The first sub-pixel $P_1$ has a first TFT $P_{131}$, a second TFT $P_{132}$, a third TFT $P_{133}$ and a pixel electrode $P_{134}$. The first TFT $P_{131}$, the second TFT $P_{132}$, the third TFT $P_{133}$, the storage capacitance line $SC_1$ and the pixel electrode $P_{134}$ are formed on the TFT substrate. In this embodiment, in order to decrease the loading on the layout of the storage capacitance line $SC_1$ caused when an auxiliary capacitor $C_S$ is being formed (e.g., to prevent the extra branches of the storage capacitance line $SC_1$ from increasing the loading of the storage capacitance line $SC_1$), a distance $S_1$ between the storage capacitance line $SC_1$ and the first scan line $SL_1$ is configured to be longer than a distance $S_2$ between the storage capacitance line $SC_1$ and the second scan line $SL_2$. The distance $S_2$ between the storage capacitance line $SC_1$ and the second scan line $SL_2$ ranges from 4 μm to 20 μm.

The pixel electrode $P_{134}$ may also have a plurality of slits $P_{134a}$ so that the pixel electrode $P_{134}$ is formed with a pattern and the liquid crystal molecules have a predetermined inclination angle. For example, when the LCD is a twisted-nematic LCD apparatus, the slits $P_{134a}$ may be omitted. The pixel electrode $P_{134}$ is divided into a first region I and a second region II. In this embodiment, the first region I is a bright region, and the second region II is a dark region.

Referring again to FIG. 6, the first TFT $P_{131}$ has a gate electrically connected to the first scan line $SL_1$, a drain electrically connected to the first region I of the first sub-pixel $P_1$ through a via $O_1$, and a source electrically connected to the data line DL. The second TFT $P_{132}$ has a gate electrically connected to the first scan line $SL_1$, a drain electrically connected to the second region II of the first sub-pixel $P_1$ through a via $O_2$, and a source electrically connected to the data line DL. The third TFT $P_{133}$ has a gate electrically connected to the second scan line $SL_2$, a drain electrically connected to the second region II of the first sub-pixel $P_1$ through a via $O_3$, and a source electrically connected to an electrode $E_1$ of the auxiliary capacitor. Herein, the first TFT $P_{131}$, the second TFT $P_{132}$ and the third TFT $P_{133}$ are for controlling operations of the first region I and the second region II of the first sub-pixel $P_1$.

In this embodiment, a first parasitic capacitance $C_{gd1}$ is formed between the gate and the drain of the first TFT $P_{131}$, a second parasitic capacitance $C_{gd2}$ is formed between the gate and the drain of the second TFT $P_{132}$, and a third parasitic capacitance $C_{gd3}$ is formed between the gate and the drain of the third TFT $P_{133}$.

It is known that $$\Delta V_{feed-through} = C_{gd} \times (V_{gh} - V_{gl})/(C_{st} + C_{lc} + C_{gd}).$$

Thus, in order to make the two sub-pixels have the same $\Delta V_{feed-through}$ without taking into account the third parasitic capacitance $C_{gd3}$ (because the influences of the third parasitic capacitance $C_{gd3}$ generated when the second scan line $SL_2$ is enabled and disabled may offset each other), it is obtained that:

$$C_{gd1} \times (V_{gh} - V_{gl})/(C_{st1} + C_{lc1} + C_{gd1}) = C_{gd2} \times (V_{gh} - V_{gl})/(C_{st2} + C_{lc2} + C_{gd2}).$$

After $(V_{gh}-V_{gl})$ is eliminated, it is obtained that:

$$C_{gd1}/[((C_{st1}/C_{lc1})+1+(C_{gd1}/C_{lc1}))\times C_{lc1}]=C_{gd2}/[((C_{st2}/C_{lc2})+1+(C_{gd2}/C_{lc2}))\times C_{lc2}],$$

wherein, the value of each of $(C_{gd1}/C_{lc1})$ and $(C_{gd2}/C_{lc2})$ is far smaller than 1 and may thus be neglected. Thus, when $C_{st1}/C_{lc1}=C_{st2}/C_{lc2}$, it is obtained that $$C_{gd1}/[(2)\times C_{lc1}]=C_{gd2}/[(2)\times C_{lc2}].$$

However, the area/luminous flux of the bright region I is smaller than that of the dark region II due to the design. Therefore, $C_{lc2} \geq C_{lc1}$, so that $C_{gd2} \geq C_{gd1}$. That is, the first TFT $P_{131}$ and the second TFT $P_{132}$ satisfy the formula (1):

$$C_{gd2} \geq C_{gd1} \quad (1).$$

In addition, a region, which is located between the source and the drain of the TFT and contains the semiconductor region has a corresponding width referred to as a channel width W, and the distance between the source and the drain is referred to as a channel length L. Referring again to FIG. 6 according to the above-mentioned descriptions, the first TFT $P_{131}$ has a first channel width $W_1$ and a first channel length $L_1$; the second TFT $P_{132}$ has a second channel width $W_2$ and a second channel length $L_2$; and the third TFT $P_{133}$ has a third channel width $W_3$ and a third channel length $L_3$.

The first TFT $P_{131}$ and the second TFT $P_{132}$ satisfy the formula (2):

$$W_2/L_2 \geq W_1/L_1 \quad (2).$$

In this embodiment, the ratio of the second channel width $W_2$ to the second channel length $L_2$ is equal to the ratio of the first channel width $W_1$ to the first channel length $L_1$.

Figure 8:
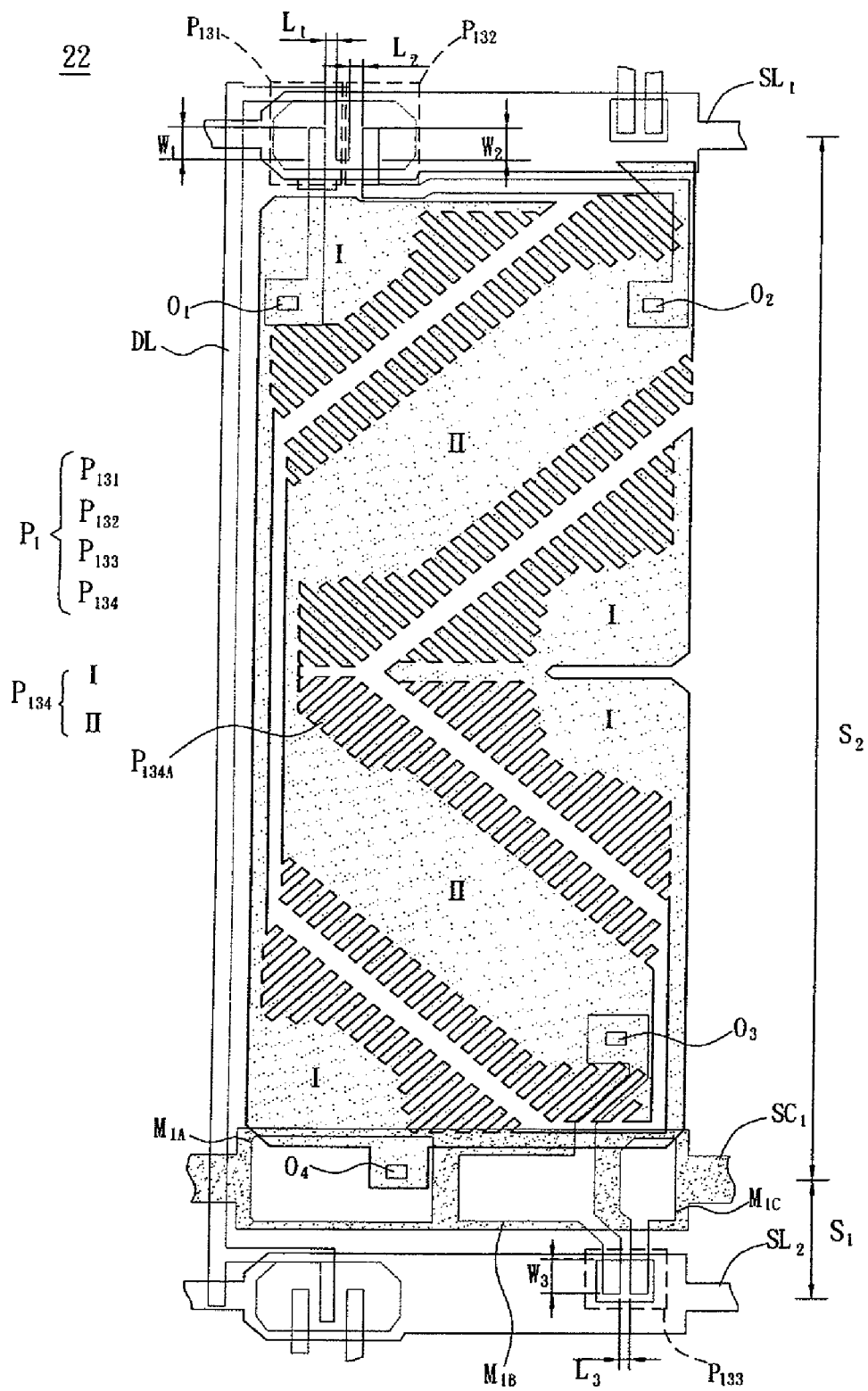
FIG. 8 is a plan-view schematic illustration showing another sub-pixel structure of the TFT substrate of the LCD panel according to an embodiment of the invention.

Referring to FIG. 8, it is also possible to make the overlapped area between (a) the drain of the first TFT $P_{131}$ as well as the first region I (bright region) of the first sub-pixel $P_1$ and (b) the first scan line $SL_1$ be smaller than the overlapped area between (c) the drain of the second TFT $P_{132}$ as well as the second region II (dark region) of the first sub-pixel $P_1$ and (d) the first scan line $SL_1$ to satisfy the above-mentioned requirements. For example, the shapes of the first TFT $P_{131}$ and the second TFT $P_{132}$ may be the same, but the pixel electrode $P_{134}$ of the second region II is extended (FIG. 8) to overlap the first scan line $SL_1$. Alternatively, the first TFT $P_{131}$ and the second TFT $P_{132}$ may have the same L and an adjustment is made to make $W_2>W_1$ (not shown). Or the above-mentioned methods may be utilized simultaneously to satisfy the formula (1).

Figure 9:
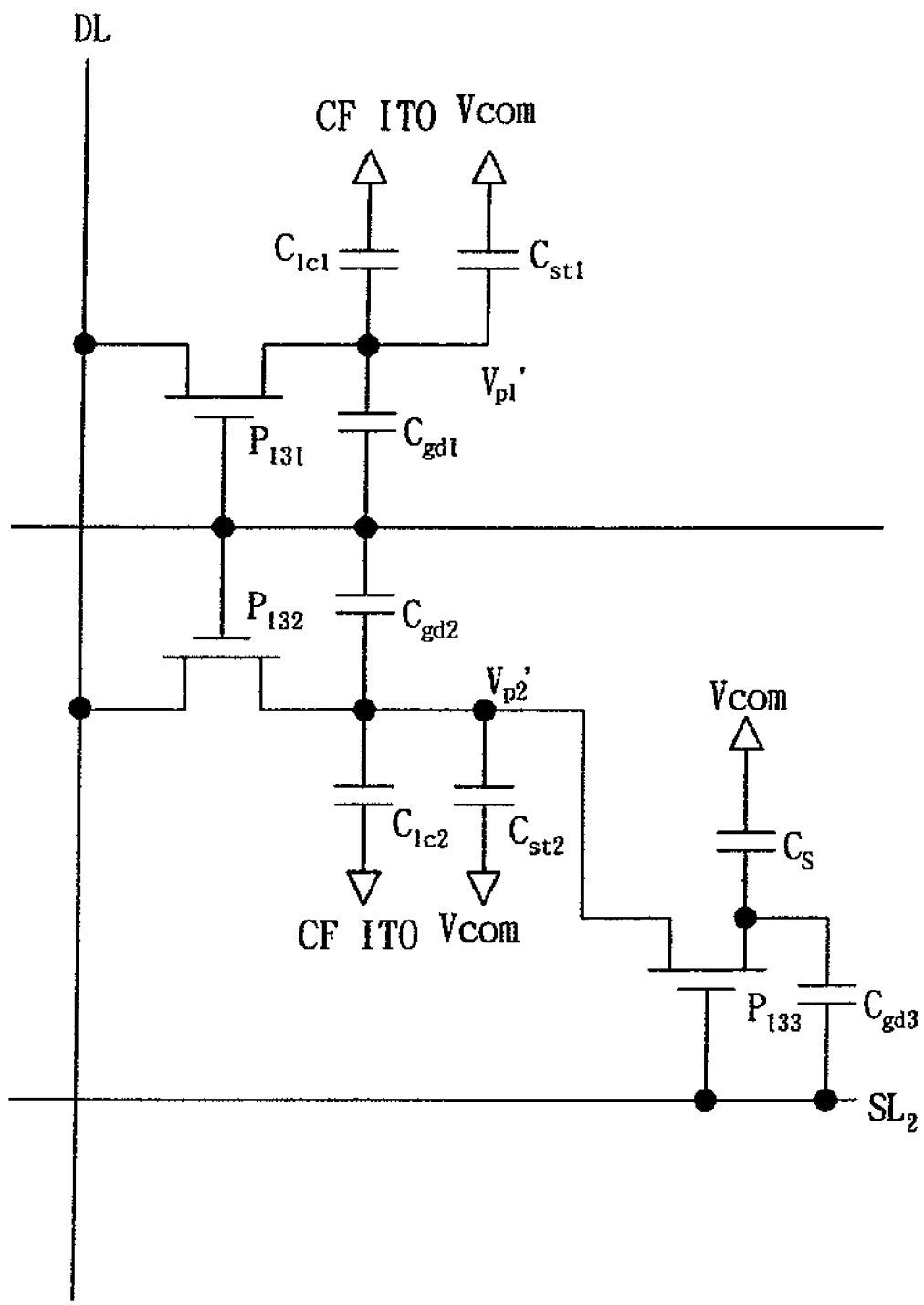
FIG. 9 is an equivalent circuit diagram of the sub-pixel of the TFT substrate of the LCD panel according to the embodiment of the invention.

Please refer to FIGS. 6 and 9, wherein FIG. 9 is an equivalent circuit diagram of FIG. 6. In this embodiment, the LCD panel 22 further includes a patterned metal layer $M_1$ disposed opposite to the storage capacitance line $SC_1$. A portion of the patterned metal layer $M_{1A}$ is electrically connected to the first region I through a via $O_4$ to form a first storage capacitor $C_{st1}$ together with the storage capacitance line $SC_1$. Another portion of the patterned metal layer $M_{1B}$ is electrically connected to the third TFT $P_{133}$ and the second region II through the via $O_3$ to form a second storage capacitor $C_{st2}$ together with the storage capacitance line $SC_1$. A further portion of the patterned metal layer $M_{1C}$ is electrically connected to the third TFT $P_{133}$ to form an auxiliary capacitor $C_S$ together with the storage capacitance line $SC_1$. The liquid crystal capacitor is defined by the corresponding arrangement of the pixel electrode $P_{134}$ and the common electrode $P_{135}$. That is, the first region I of the first sub-pixel $P_1$ and the common electrode $P_{135}$ form a first liquid crystal capacitor $C_{lc1}$, and the second region II of the first sub-pixel $P_1$ and the common electrode $P_{135}$ form a second liquid crystal capacitor $C_{lc2}$.

In this embodiment, in order make two sub-pixels have the same $\Delta V_{feed\,through}$, it is derived that $$C_{gd1}/[((C_{st1}/C_{lc1})+1+(C_{gd1}/C_{lc1}))\times C_{lc1}]=C_{gd2}/[((C_{st2}/C_{lc2})+1+(C_{gd2}/C_{lc2}))\times C_{lc2}],$$

wherein the value of each of $(C_{gd1}/C_{lc1})$ and $(C_{gd2}/C_{lc2})$ is far smaller than 1 and may thus be neglected. Thus, when it is assumed that the first TFT $P_{131}$ and the second TFT $P_{132}$ have the same designed size (i.e., it is assumed that $C_{gd2}=C_{gd1}$), it is obtained that $$1/[(C_{st1}/C_{lc1})+1\times C_{lc1}]=1/[((C_{st2}/C_{lc2})+1)\times C_{lc2}].$$

Also, the luminous flux or area of the bright region I is configured to be smaller than that of the dark region II (i.e., $C_{lc2} \geq C_{lc1}$). Thus, it is obtained that $$(C_{st1}/C_{lc1})+1 \geq (C_{st2}/C_{lc2})+1,$$

and thus $$(C_{st1}/C_{lc1}) \geq (C_{st2}/C_{lc2}).$$

That is, the ratios of the storage capacitors of the first region I and the second region II to the liquid crystal capacitor satisfy the formula (3):

$$C_{st1}/C_{lc1} > C_{st2}/C_{lc2} \quad (3).$$

In this embodiment, it is possible to achieve $C_{st1}/C_{lc1} > C_{st2}/C_{lc2}$ by configuring the area of the first region I to be smaller than that of the second region II and configuring the first region I and the second region II to have storage capacitors of substantially the same storage capacity.

In addition, each sub-pixel has a ratio $R_a$, which satisfies the formula (4):

$$R_a = C_S/(C_S+C_{lc}+C_{st}) \quad (4),$$

wherein $C_{lc}=C_{lc1}+C_{lc2}$ in this embodiment; and $$C_{st}=C_{st1}+C_{st2}.$$

When the ratio of the area of the bright region to that of the dark region is equal to 1:2, the influence of the transmission rate on $R_a$ will be as described in the following section. Assuming that the transmission rate is equal to a reference value (100%) when $R_a=0.15$, the transmission rate is equal to 95% when $R_a=0.2$; and the transmission rate is equal to 87.8% when $R_a=0.25$. Thus, the above-mentioned ratio preferably ranges from 0.1 to 0.35. In brief, the ratio $R_a$ represents the ratio of the auxiliary capacitor $C_S$ to the equivalent capacitor of the overall sub-pixel.

In addition, the pixel of the TFT substrate further includes a second sub-pixel (not shown) and a third sub-pixel (not shown). The first sub-pixel $P_1$, the second sub-pixel and the third sub-pixel are disposed adjacent one another in a direction along the first scan line $SL_1$. In this particular embodiment, it is assumed that the first sub-pixel $P_1$ is a red sub-pixel (R), the second sub-pixel is a green sub-pixel (G) and the third sub-pixel is a blue sub-pixel (B). Typically, the brightness output of the display at the short wavelength has to be increased if the specification of the high color temperature is to be satisfied. For example, the blue region of the display has to be reduced because the auxiliary capacitor causes the transmission rate to decrease. Thus, the ratio $R_a$ of each sub-pixel satisfies the formula (5):

$$R_a(R)=R_a(G) \geq R_a(B) \quad (5).$$

Figure 10:
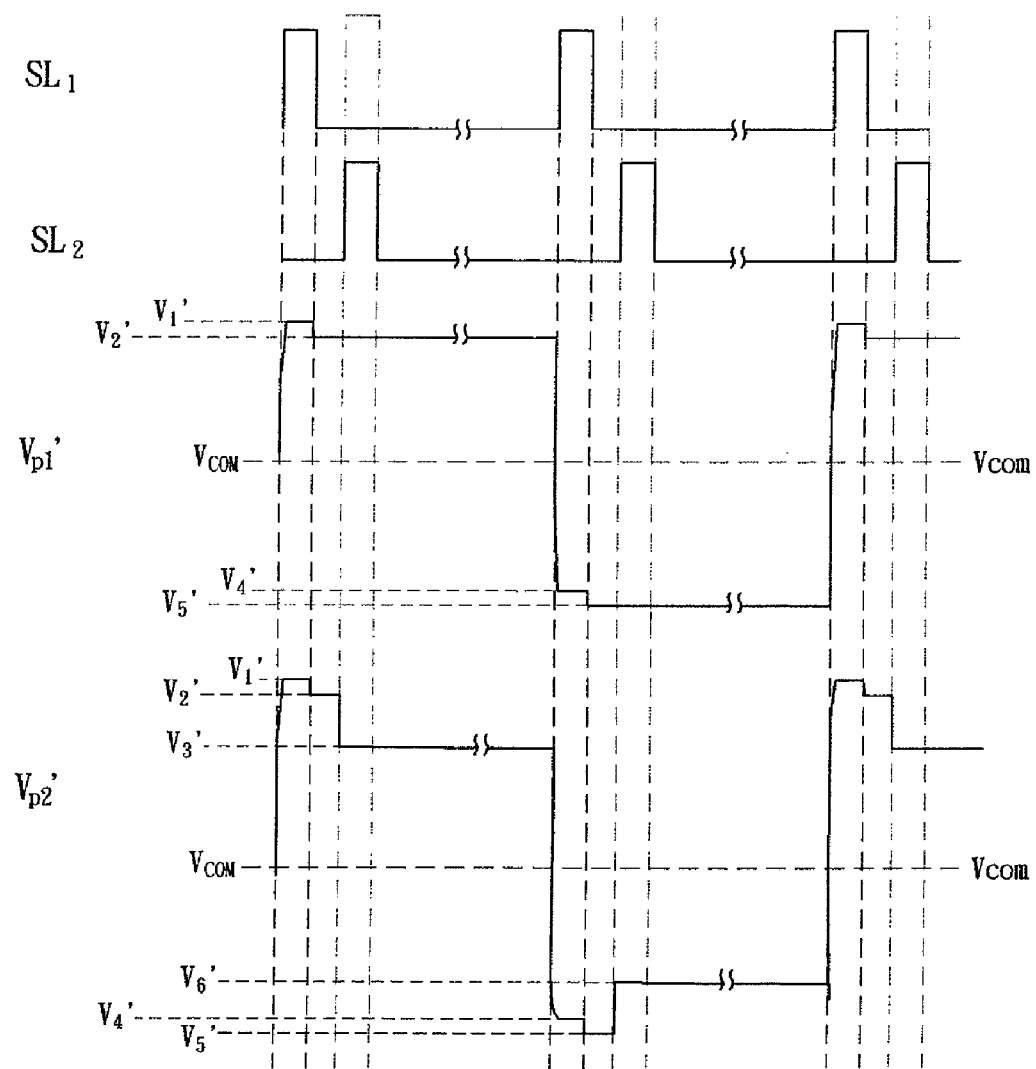
FIG. 10 is an operational timing chart of scan lines and nodes VP1' and VP2' in FIG. 9.

FIG. 10 is a timing chart showing operational timings of the first scan line $SL_1$, the second scan line $SL_2$ and the nodes $V_{P1'}$ and $V_{P2'}$ in FIG. 9.

First, in the first frame time, the first scan line $SL_1$ inputs a signal to turn on the first TFT $P_{131}$ and the second TFT $P_{132}$ and inputs sub-pixel data through the data line DL so that the potentials of the nodes $V_{P1'}$ and $V_{P2'}$ are simultaneously equal to $V_1$. When the first scan line $SL_1$ stops inputting the signal, the first TFT $P_{131}$ and the second TFT $P_{132}$ instantaneously turn off. However, the first parasitic capacitance $C_{gd1}$ and the second parasitic capacitance $C_{gd2}$ between the gates and the drains of the TFTs $P_{131}$ and $P_{132}$ are designed such that $C_{gd2} \geq C_{gd1}$ or $W_2/L_2 \geq W_1/L_1$ in this embodiment of the invention. Consequently, the potentials of the nodes $V_{P1'}$ and $V_{P2'}$ are respectively changed from $V_1$ to $V_2$. In other words, the voltage differences between the pixel signals of the nodes $V_{P1'}$ and $V_{P2'}$ and the common voltage $V_{com}$ can be stably controlled due to the same influence of the feed-through effect.

Next, the second scan line $SL_2$ inputs the signal to turn on the third TFT $P_{133}$ so that the charges of the second storage capacitor $C_{st2}$ neutralize the first auxiliary capacitor $C_{S1}$, the voltage level of the node $V_{P2'}$ is changed to $V_3$, and the voltage level of the node $V_{P1'}$ is influenced by the second auxiliary capacitor $C_{S2}$ and is thus changed to $V_3$. Then, in the second frame time, for example, when the first scan line $SL_1$ again inputs the signal to turn on the first TFT $P_{131}$ and the second TFT $P_{132}$, and inputs the sub-pixel data through the data line DL, the potentials of the nodes $V_{P1'}$ and $V_{P2'}$ are made simultaneously equal to $V_4$. When the first scan line $SL_1$ stops inputting the signal, the first TFT $P_{131}$ and the second TFT $P_{132}$ instantaneously turn off. However, the first parasitic capacitance $C_{gd1}$ and the second parasitic capacitance $C_{gd2}$ between the gates and the drains of the TFTs $P_{131}$ and $P_{132}$ are particularly configured in this embodiment of the invention such that $C_{gd2} \geq C_{gd1}$ or $W_2/L_2 \geq W_1/L_1$. Consequently, the potentials of the nodes $V_{P1'}$ and $V_{P2'}$ are respectively changed from $V_4$ to $V_5$. In other words, the voltage differences between the pixel signals and the common voltage $V_{com}$ can be stably controlled due to the same influence of the feed-through effect.

Next, the second scan line $SL_2$ inputs the signal to turn on the third TFT $P_{133}$ so that the charges of the second storage capacitor $C_{st2}$ neutralize the first auxiliary capacitor $C_{S1}$ and the voltage level of the node $V_{P2'}$ is changed to $V_6$.

Figure 11:
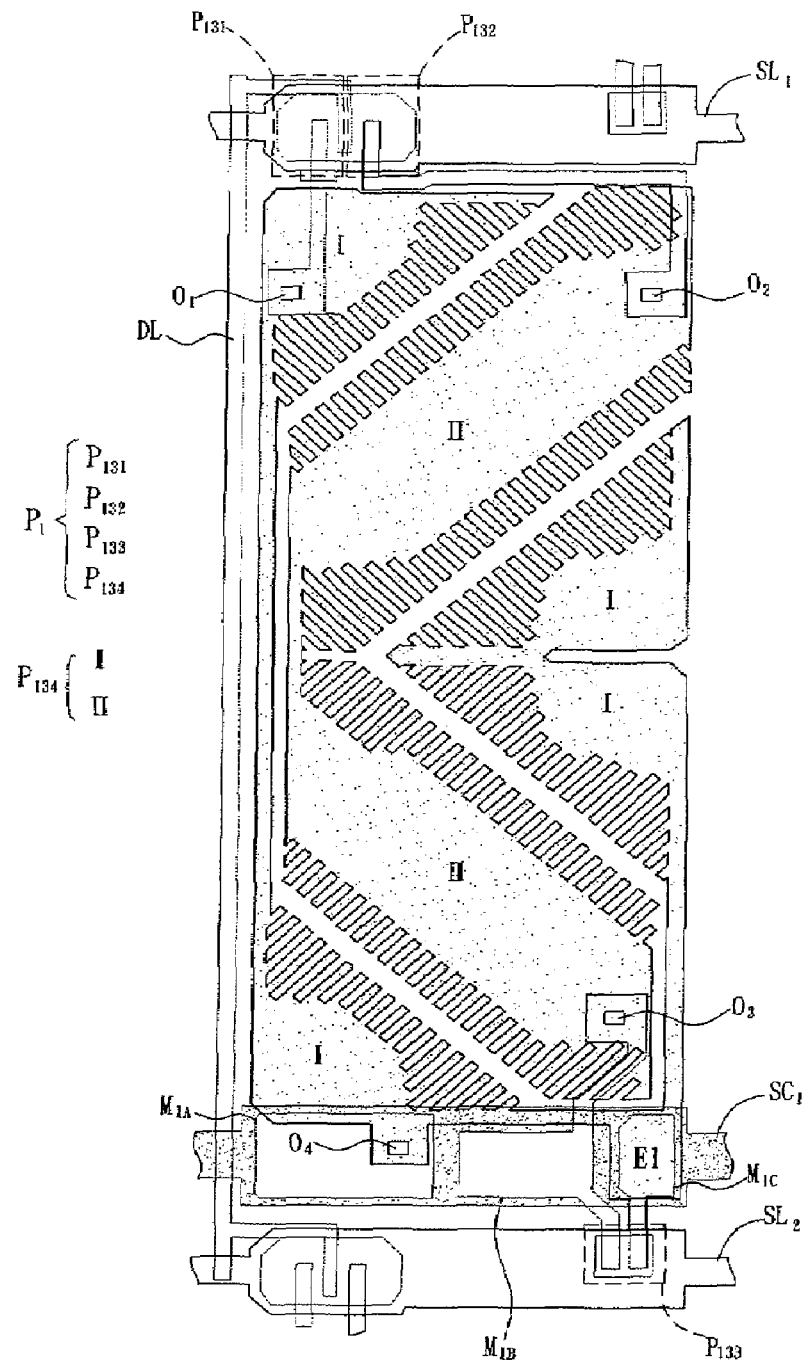
FIG. 11 is a plan-view schematic illustration showing still another sub-pixel structure of the TFT substrate of the LCD panel according to an embodiment of the invention.
Figure 12:
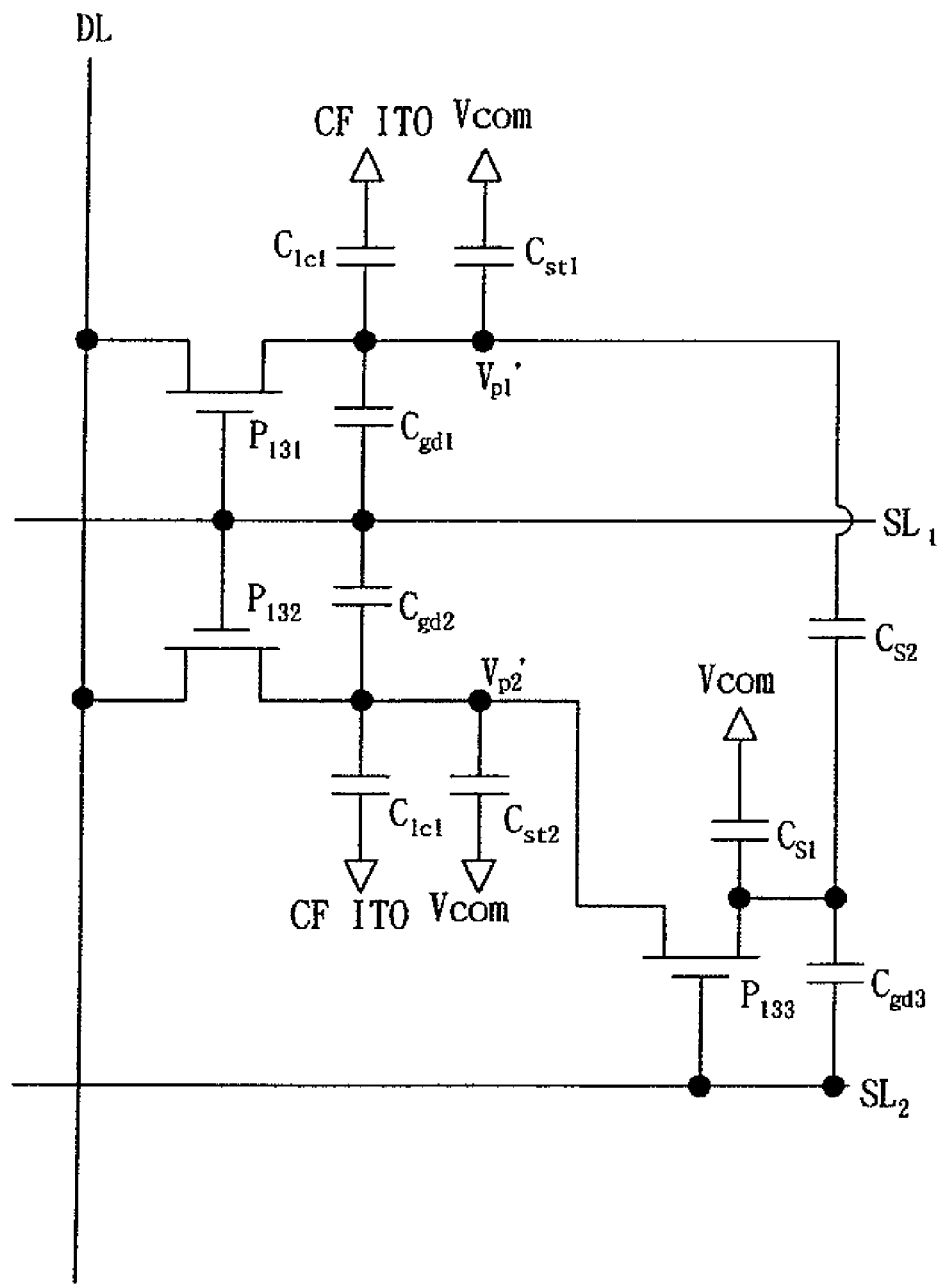
FIG. 12 is an equivalent circuit diagram of the another sub-pixel of the TFT substrate of the LCD panel according to the embodiment of the invention.

Referring to FIGS. 11 and 12, a portion of the patterned metal layer $M_{1C}$ in the LCD panel 22 is disposed opposite to the first region I to form the second auxiliary capacitor $C_{S2}$ in this embodiment.

Figure 13:
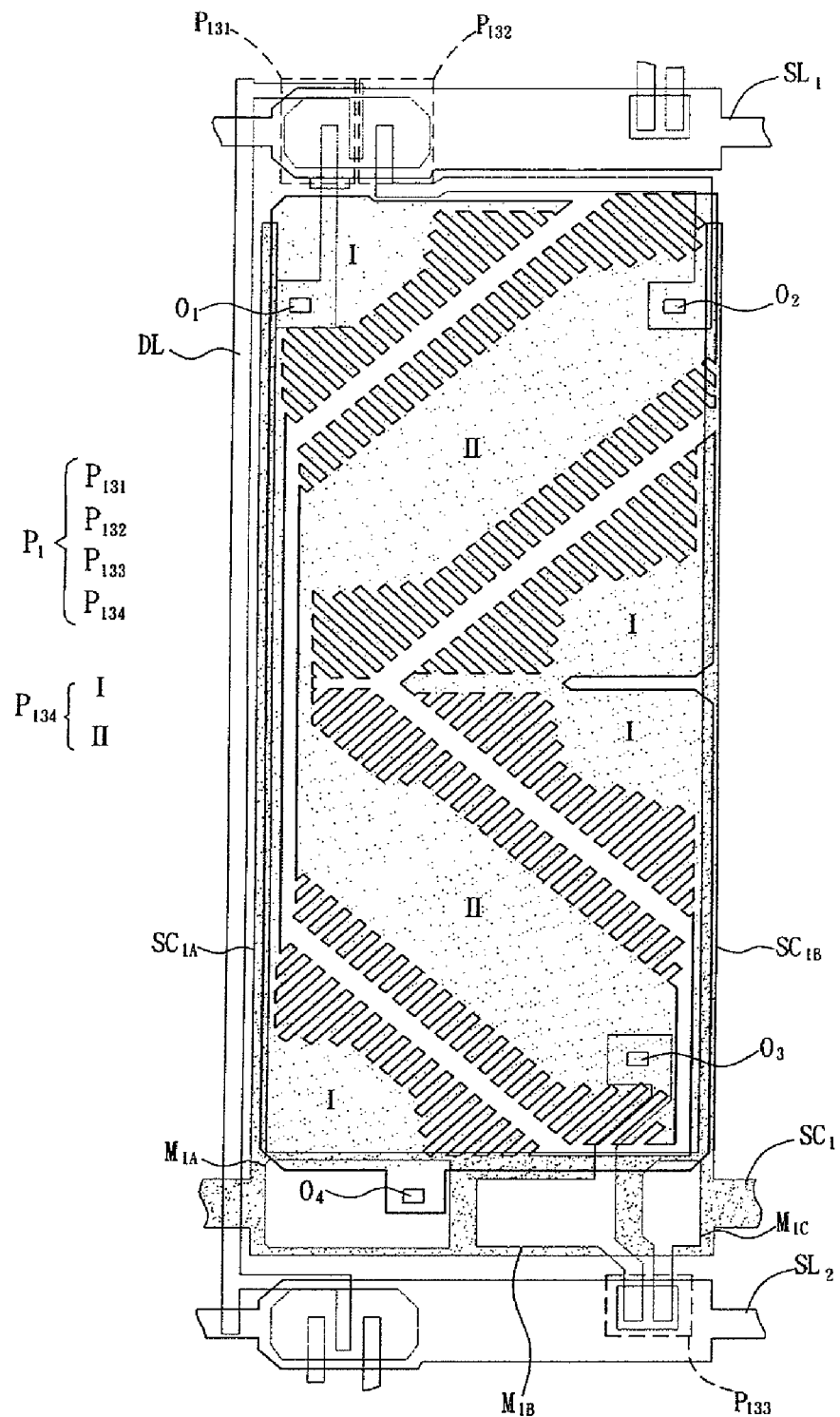
FIG. 13 is a plan-view schematic illustration showing yet still another sub-pixel structure of the TFT substrate in the LCD panel according to an embodiment of the invention, wherein a storage capacitance line has two electrical extensions.

Referring to FIG. 13, the storage capacitance line $SC_1$ of this embodiment further has two electrical extensions $SC_{1A}$ and $SC_{1B}$, which are disposed opposite to the edge of the pixel electrode $P_{134}$ of each sub-pixels $P_1$ in the direction along the data line DL. The width of each of the electrical extensions $SC_{1A}$ and $SC_{1B}$ may be about 4 μm.

In the above disclosed embodiments, when it is desirable to place a black matrix layer $BM_1$ (FIG. 7) on the sub-pixel structure 222 of the opposing substrate to cover the pixel electrode $P_{134}$ on the TFT substrate 221 so that to reduce the light-leakage phenomenon induced by the irregular arrangement of the liquid crystal molecules, the area to be covered by the black matrix layer $BM_1$ when the opposing substrate and the TFT substrate are combined can be reduced because the electrical extensions $SC_{1A}$ and $SC_{1B}$ of the storage capacitance line $SC_1$ have partially covered two side edges of the pixel electrode $P_{134}$. Thus, the aperture ratio of the first sub-pixel $P_1$ may be increased. In addition, the overlapping portions between the electrical extensions $SC_{1A}$ and $SC_{1B}$ of the storage capacitance line $SC_1$ and the pixel electrode $P_{134}$ may also be formed with a storage capacitor $C_{st}$ so that the capacitance of the storage capacitor $C_{st}$ can be increased.

Figure 14:
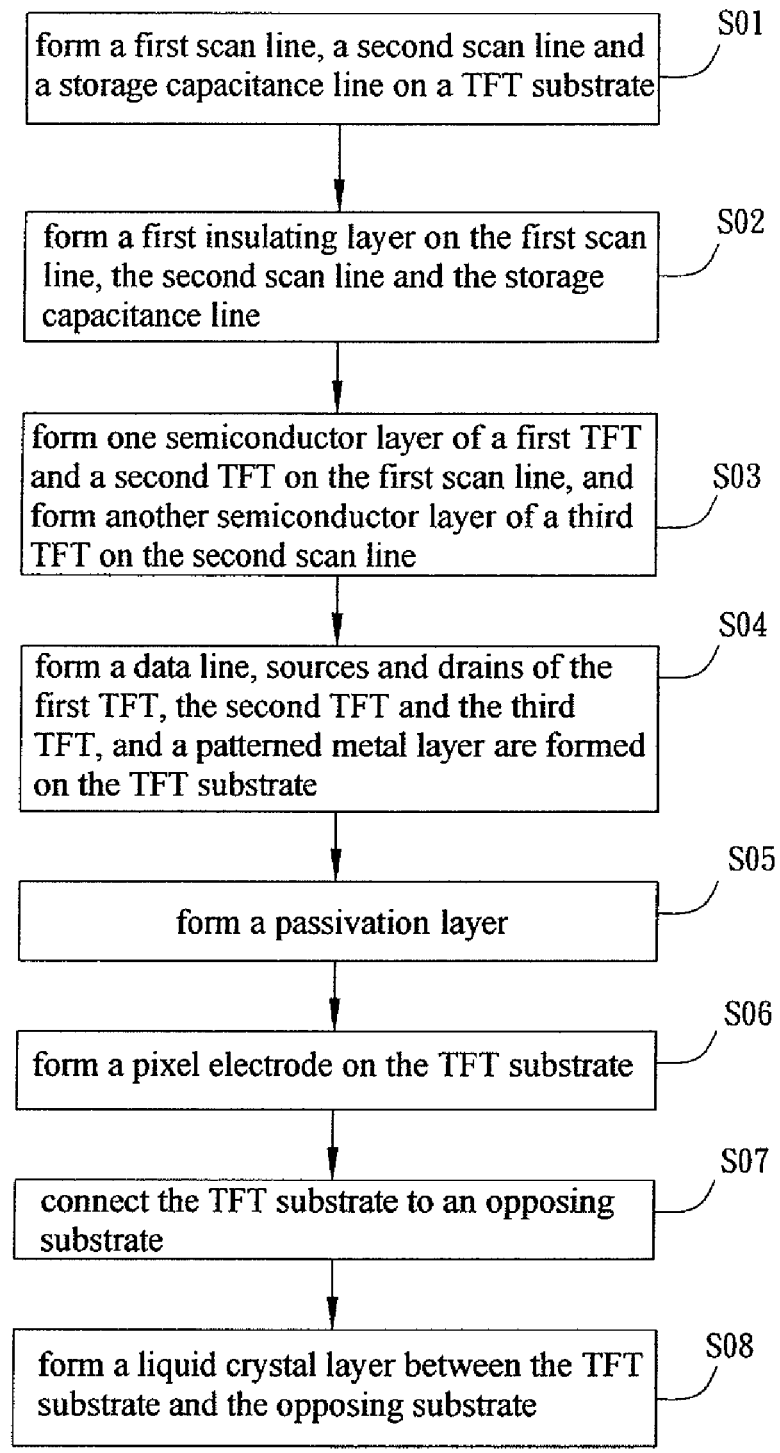
FIG. 14 is a flow chart showing a manufacturing method of the LCD panel according to an embodiment of the invention.

Referring to FIG. 14, a manufacturing method of a LCD panel according to an embodiment of the invention includes steps S01 to S08. Illustrations will be made with reference to FIG. 14 in conjunction with FIGS. 6 and 7. In the step S01, a first scan line $SL_1$, a second scan line $SL_2$ and a storage capacitance line $SC_1$ are formed on a TFT substrate 221 using a first metal layer, such as a single layer or a multi-layer of aluminum, molybdenum, copper or silver or alloys thereof. In the step S02, a first insulating layer is formed on the first scan line $SL_1$, the second scan line $SL_2$ and the storage capacitance line $SC_1$ using an insulating material, such as silicon nitride (SiNx) or silicon oxide (SiOx). In the step S03, a semiconductor layer of a first TFT $P_{131}$ and a second TFT $P_{132}$ is formed on the first scan line $SL_1$, and another semiconductor layer of a third TFT $P_{133}$ is formed on the second scan line $SL_2$. The first TFT $P_{131}$ has a gate electrically connected to the first scan line $SL_1$, the second TFT $P_{132}$ has a gate electrically connected to the first scan line $SL_1$, and the third TFT $P_{133}$ has a gate electrically connected to the second scan line $SL_2$. In the step S04, a data line DL, sources and drains of the first TFT $P_{131}$, the second TFT $P_{132}$ and the third TFT $P_{133}$, and a patterned metal layer $M_1$ are formed on the TFT substrate 221 using a second metal layer, such as a single layer or a multi-layer of aluminum, molybdenum, copper or silver or alloys thereof, wherein the portions of the second metal layer covering the storage capacitance line $SC_1$ form the patterned metal layers $M_{1A}$, $M_{1B}$ and $M_{1C}$. In the step S05, a passivation layer, such as silicon nitride (SiNx) or silicon oxide (SiOx), covers each layer to form a second insulating layer. In the step S06, a pixel electrode $P_{134}$ is formed on the TFT substrate 221, wherein the pixel electrode $P_{134}$ is disposed between the first scan line $SL_1$ and the second scan line $SL_2$, and is divided into a first region I and a second region II. The first region I is electrically connected to the drain of the first TFT $P_{131}$ through the via $O_1$ of the second insulating layer, the second region II is electrically connected to the drain of the second TFT $P_{132}$ through the via $O_2$ of the second insulating layer. The second region II is electrically connected to the drain of the third TFT $P_{133}$ through the via $O_3$ of the second insulating layer. One portion of the patterned metal layer $M_{1A}$ is electrically connected to the first region I through the via $O_4$ to form a first storage capacitor $C_{st1}$ together with the storage capacitance line $SC_1$. Another portion of the patterned metal layer $M_{1B}$ is electrically connected to the second region II through the via $O_3$ to form a second storage capacitor $C_{st2}$ together with the storage capacitance line $SC_1$. A further portion of the patterned metal layer $M_{1C}$ is electrically connected to the third TFT $P_{133}$ to form a first auxiliary capacitor $C_{S1}$ together with the storage capacitance line $SC_1$. In some embodiments, a portion of the patterned metal layer $M_{1C}$ and the first region I form a second auxiliary capacitor $C_{S2}$. Next, in the step S07, the TFT substrate 221 is connected to an opposing substrate 222. Finally, a liquid crystal layer is formed between the TFT substrate 221 and the opposing substrate 222 in the step S08 to obtain the LCD panel 22. One of ordinary skill in the art may understand that the order of several steps, e.g., the steps S07 and S08, can be changed.

In the step S01, the distance $S_1$ between the storage capacitance line $SC_1$ and the first scan line $SL_1$ may be longer than the distance $S_2$ between the storage capacitance line $SC_1$ and the second scan line $SL_2$, and the distance $S_2$ between the storage capacitance line $SC_1$ and the second scan line $SL_2$ may range from 4 μm to 20 μm. In addition, the TFTs $P_{131}$ and $P_{132}$ satisfy the formula (1) in the step S04:

$$C_{gd2} \geq C_{gd1} \quad (1),$$

wherein $C_{gd1}$ denotes a parasitic capacitance between the gate and the drain of the first TFT $P_{131}$, and $C_{gd2}$ denotes a parasitic capacitance between the gate and the drain of the second TFT $P_{132}$. Also, the following formula (2) is also satisfied:

$$W_2/L_2 \geq W_1/L_1 \quad (2)$$

wherein $W_1$ denotes a channel width of the first TFT $P_{131}$, $W_2$ denotes a channel width of the second TFT $P_{132}$, $L_1$ denotes a channel length of the first TFT $P_{131}$, and $L_2$ denotes a channel length of the second TFT $P_{132}$.

Furthermore, in the step S04, a first overlapped area between (a) the drain of the first TFT $P_{131}$ as well as a first conductive pattern (not shown) and (b) the first scan line $SL_1$ is formed to be smaller than a second overlapped area between (c) the drain of the second TFT $P_{132}$ as well as a second conductive pattern (not shown) and (d) the first scan line $SL_1$. The first conductive pattern has a potential equal to that of the drain of the first TFT $P_{131}$ and the second conductive pattern has a potential equal to that of the drain of the second TFT $P_{132}$.

In addition, in the step S07, a region forming ratio of the first region I to the second region II satisfies the formula (3):

$$C_{st1}/C_{lc1} > C_{st2}/C_{lc2} \quad (3),$$

wherein $C_{st1}$ denotes a first storage capacitor, $C_{st2}$ denotes a second storage capacitor, $C_{lc1}$ denotes a first liquid crystal capacitor, and $C_{lc2}$ denotes a second liquid crystal capacitor.

In addition, in the step S01, the storage capacitance line $SC_1$ may form at least one electrical extension or two electrical extensions $SC_{1A}$ and $SC_{1B}$, which are disposed opposite to an edge of the pixel electrode $P_{134}$ in a direction along the data line DL, wherein the electrical extensions $SC_{1A}$ and $SC_{1B}$ may partially overlap the pixel electrode $P_{134}$.

In summary, the distance between the storage capacitance line and the first scan line is longer than the distance between the storage capacitance line and the second scan line in accordance with the LCD panel and its manufacturing method according to embodiments of the invention. Thus, the LCD apparatus and the LCD panel of embodiments of the invention may have the simplified interconnections whenever interconnections have to be additionally extended and added from the storage capacitance line. In addition, embodiments of the invention solve the problem of flickering caused by different signals relative to $V_{com}$ in the bright region and the dark region by adjusting the values of $C_{gd}$ and $C_{st}/C_{lc}$ in the subpixel. Moreover, the above-mentioned technology can be applied to the LCD panel with the wide view angle to enhance the color difference compensating ability, to improve the phenomenon of color shift difference, and thus to provide a better image display quality.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A liquid crystal display (LCD) panel, comprising a thin film transistor substrate, wherein the thin film transistor substrate further comprises:

a first scan line disposed on the thin film transistor substrate;

a second scan line disposed on the thin film transistor substrate and arranged in parallel to the first scan line;

a plurality of pixels wherein each of the pixels comprises a first sub-pixel disposed between the first scan line and the second scan line, and has a first thin-film transistor (TFT), a second TFT, a third TFT and a pixel electrode, the pixel electrode is divided into a first region and a second region for displaying different signals, the first TFT is electrically connected to the first scan line via a first gate and connected to the first region by a first drain electrode, the second TFT is electrically connected to the first scan line via a second gate and connected to the second region by a second drain electrode, and the third TFT is electrically connected to the second scan line via a third gate and connected to the second region by a third drain electrode;

a data line connecting a first source electrode of the first TFT and a second source electrode of the second TFT; and a storage capacitance line electrically connected to the third TFT;

wherein the TFTs satisfy the formula (1):

$$C_{gd2} > C_{gd1} \quad (1),$$

wherein $C_{gd1}$ denotes a parasitic capacitance between the first drain electrode of the first TFT and the first scan line, and $C_{gd2}$ denotes a parasitic capacitance between the second drain electrode of the second TFT and the first scan line.

2. A liquid crystal display (LCD) panel, comprising a thin film transistor substrate, wherein the thin film transistor substrate further comprises:

a first scan line disposed on the thin film transistor substrate;

a second scan line disposed on the thin film transistor substrate and arranged in parallel to the first scan line;

a plurality of pixels wherein each of the pixels comprises a first sub-pixel disposed between the first scan line and the second scan line, and has a first thin-film transistor (TFT), a second TFT, a third TFT and a pixel electrode, the pixel electrode is divided into a first region and a second region for displaying different signals, the first TFT is electrically connected to the first scan line via a first gate and connected to the first region by a first drain electrode, the second TFT is electrically connected to the first scan line via a second gate and connected to the second region by a second drain electrode, and the third TFT is electrically connected to the second scan line via a third gate and connected to the second region by a third drain electrode;

a data line connecting a first source electrode of the first TFT and a second source electrode of the second TFT; and a storage capacitance line electrically connected to the third TFT;

wherein the TFTs satisfy the formula (2):

$$W_2/L_2 > W_1/L_2 \quad (2),$$

wherein $W_1$ is a channel width of the first TFT, $W_2$ is a channel width of the second TFT, $L_1$ is a channel length of the first TFT and $L_2$ is a channel length of the second TFT.

3. A liquid crystal display (LCD) panel, comprising a thin film transistor substrate, wherein the thin film transistor substrate further comprises:

a first scan line disposed on the thin film transistor substrate;

a second scan line disposed on the thin film transistor substrate and arranged in parallel to the first scan line;

a plurality of pixels wherein each of the pixels comprises a first sub-pixel disposed between the first scan line and the second scan line, and has a first thin-film transistor (TFT), a second TFT, a third TFT and a pixel electrode, the pixel electrode is divided into a first region and a second region for displaying different signals, the first TFT is electrically connected to the first scan line via a first gate and connected to the first region by a first drain electrode, the second TFT is electrically connected to the first scan line via a second gate and connected to the second region by a second drain electrode, and the third TFT is electrically connected to the second scan line via a third gate and connected to the second region by a third drain electrode;

a data line connecting a first source electrode of the first TFT and a second source electrode of the second TFT; and a storage capacitance line electrically connected to the third TFT;

said LCD panel further comprising:

an opposing substrate disposed opposite to the TFT substrate and having a common electrode, wherein a first liquid crystal capacitor is formed between the common electrode and the first region of the first sub-pixel, and a second liquid crystal capacitor is formed between the common electrode and the second region of the first sub-pixel;

a liquid crystal layer disposed between the TFT substrate and the opposing substrate; and a patterned metal layer disposed opposite to the storage capacitance line, wherein a first portion of the patterned metal layer is electrically connected to the first region to form a first storage capacitor together with the storage capacitance line, a second portion of the patterned metal layer is electrically connected to the second region and the third TFT to form a second storage capacitor together with the storage capacitance line, and a third portion of the patterned metal layer is electrically connected to the third TFT to form a first auxiliary capacitor together with the storage capacitance line and to form a second auxiliary capacitor together with the first region, wherein region forming ratios of the first region to the second region of the first sub-pixel satisfy the formula (3):

$$C_{st1}/C_{lc1} > C_{st2}/C_{lc2} \qquad (3),$$

wherein $C_{st1}$ denotes the first storage capacitor, $C_{st2}$ denotes the second storage capacitor, $C_{lc1}$ denotes the first liquid crystal capacitor, and $C_{lc2}$ denotes the second liquid crystal capacitor.

4. A liquid crystal display (LCD) panel, comprising a thin film transistor substrate, wherein the thin film transistor substrate further comprises:

a first scan line disposed on the thin film transistor substrate;

a second scan line disposed on the thin film transistor substrate and arranged in parallel to the first scan line;

a plurality of pixels wherein each of the pixels comprises a first sub-pixel disposed between the first scan line and the second scan line, and has a first thin-film transistor (TFT), a second TFT, a third TFT and a pixel electrode, the pixel electrode is divided into a first region and a second region for displaying different signals, the first TFT is electrically connected to the first scan line via a first gate and connected to the first region by a first drain electrode, the second TFT is electrically connected to the first scan line via a second gate and connected to the second region by a second drain electrode, and the third TFT is electrically connected to the second scan line via a third gate and connected to the second region by a third drain electrode;

a data line connecting a first source electrode of the first TFT and a second source electrode of the second TFT; and a storage capacitance line electrically connected to the third TFT;

wherein the pixels each further comprise a second sub-pixel and a third sub-pixel, the first sub-pixel, the second sub-pixel and the third sub-pixel are disposed adjacent one another along the first scan line, and each of the sub-pixels has a ratio $R_a$ defined by the formula (4):

$$R_a = C_S/(C_S + C_{lc} + C_{st}) \qquad (4),$$

wherein $C_S$ denotes an auxiliary capacitor of each of the sub-pixels, $C_{lc}$ denotes a liquid crystal capacitor of each of the sub-pixels, and $C_{st}$ denotes a storage capacitor of each of the sub-pixels.

5. The LCD panel according to claim 4, wherein the ratio $R_a$ ranges from 0.1 to 0.35.

6. The LCD panel according to claim 4, wherein the first sub-pixel is a red sub-pixel, the second sub-pixel is a green sub-pixel, the third sub-pixel is a blue sub-pixel, and the ratio $R_a$ of each of the sub-pixels satisfies the formula (5):

$$R_{a1} = R_{a2} \geq R_{a3} \qquad (5),$$

wherein $R_{a1}$ denotes the ratio of the red pixel, $R_{a2}$ denotes the ratio of the green pixel, and $R_{a3}$ denotes the ratio of the blue pixel.

7. A liquid crystal display (LCD) panel, comprising a thin film transistor substrate, wherein the thin film transistor substrate further comprises:

a first scan line disposed on the thin film transistor substrate;

a second scan line disposed on the thin film transistor substrate; and a plurality of pixels each comprising a first sub-pixel, which is disposed between the first scan line and the second scan line, wherein said first sub-pixel has a first thin-film transistor (TFT), a second TFT, a third TFT and a pixel electrode, the pixel electrode is divided into a first region and a second region for displaying different signals, the first TFT has a first gate electrically connected to the first scan line, and a first drain electrode electrically connected to the first region, the second TFT has a second gate electrically connected to the first scan line, and a second drain electrode electrically connected to the second region, the third TFT has a third gate electrically connected to the second scan line, and a third drain electrode electrically connected to the second region; and a data line electrically connecting a first source electrode of the first TFT and a second source electrode of the second TFT, wherein the first scan line overlaps a first conductive pattern, which is connected to the first drain electrode and comprises the first region of the pixel electrode, in a first overlapped area;

the first scan line overlaps a second conductive pattern, which is connected to the second drain electrode and comprises the second region of the pixel electrode, in a second overlapped area; and both said first overlapping area and said second overlapping area are not zero and said first overlapped area is smaller than said second overlapped area.

8. The LCD panel according to claim 7, wherein the storage capacitance line is disposed between the pixel electrode and the second scan line.

9. The LCD panel according to claim 7, wherein the TFTs satisfy the formula (1):

$$C_{gd2} \geq C_{gd1} \tag{1},$$

wherein $C_{gd1}$ denotes a parasitic capacitance between the first drain electrode of the first TFT and the first scan line, and $C_{gd2}$ denotes a parasitic capacitance between the second drain of the second TFT and the first scan line.

10. The LCD panel according to claim 7, wherein the TFTs satisfy the formula (2):

$$W_2/L_2 \geq W_1/L_2 \tag{2},$$

wherein $W_1$ is a channel width of the first TFT, $W_2$ is a channel width of the second TFT, $L_1$ is a channel length of the first TFT and $L_2$ is a channel length of the second TFT.

11. The LCD panel according to claim 7, further comprising:

an opposing substrate disposed opposite to the TFT substrate and having a common electrode, wherein a first liquid crystal capacitor is formed between the common electrode and the first region of the first sub-pixel, and a second liquid crystal capacitor is formed between the common electrode and the second region of the first sub-pixel;

a liquid crystal layer disposed between the TFT substrate and the opposing substrate;

a storage capacitance line formed on the TFT substrate in parallel to the first scan line and the second scan line and electrically connected to the third TFT; and a patterned metal layer disposed opposite to the storage capacitance line, wherein a first portion of the patterned metal layer is electrically connected to the first region to form a first storage capacitor together with the storage capacitance line, a second portion of the patterned metal layer is electrically connected to the second region and the third TFT to form a second storage capacitor together with the storage capacitance line, and a third portion of the patterned metal layer is electrically connected to the third TFT to form a first auxiliary capacitor together with the storage capacitance line and to form a second auxiliary capacitor together with the first region;

wherein region forming ratios of the first region to the second region of the first sub-pixel satisfy the formula (3):

$$C_{st1}/C_{lc1} > C_{st2}/C_{lc2} \tag{3},$$

wherein $C_{st1}$ denotes the first storage capacitor, $C_{st2}$ denotes the second storage capacitor, $C_{lc1}$ denotes the first liquid crystal capacitor, and $C_{lc2}$ denotes the second liquid crystal capacitor.

12. The LCD panel according to claim 7, wherein the pixels each further comprise a second sub-pixel and a third sub-pixel, the first sub-pixel, the second sub-pixel and the third sub-pixel are disposed adjacent one another along the first scan line, and each of the sub-pixels has a ratio $R_a$ defined by the formula (4):

$$R_a = C_S/(C_S + C_{lc} + C_{st}) \tag{4},$$

wherein $C_S$ denotes an auxiliary capacitor of each of the sub-pixels, $C_{lc}$ denotes a liquid crystal capacitor of each of the sub-pixels, and $C_{st}$ denotes a storage capacitor of each of the sub-pixels; and wherein the first sub-pixel is a red sub-pixel, the second sub-pixel is a green sub-pixel, the third sub-pixel is a blue sub-pixel, and the ratio $R_a$ of each of the sub-pixels satisfies the formula (5):

$$R_{a1} = R_{a2} \geq R_{a3} \tag{5},$$

wherein $R_{a1}$ denotes the ratio of the red pixel, $R_{a2}$ denotes the ratio of the green pixel, and $R_{a3}$ denotes the ratio of the blue pixel.

13. A method of manufacturing a liquid crystal display (LCD) panel, the method comprising steps of:

forming a first scan line and a second scan line on a thin-film transistor (TFT) substrate;

forming a first TFT and a second TFT having
first and second gates electrically connected to the first scan line, and
first and second drains overlapping the first scan line;

forming a third TFT having a third gate electrically connected to the second scan line;

forming a data line on the TFT substrate to electrically connect first and second sources of the first and second TFTs;

forming a pixel electrode on the TFT substrate and between the first scan line and the second scan line;

connecting the TFT substrate to an opposing substrate; and forming a liquid crystal layer between the TFT substrate and the opposing substrate;

wherein
the pixel electrode is divided into a first region and a second region for displaying different signals, the first drain of the first TFT is electrically connected to the first region, the second drain of the second TFT is electrically connected to the second region, and a third drain of the third TFT is electrically connected to the second region; and a first non-zero overlapped area, where said first scan line overlaps said first drain and said first region, is formed to be smaller than a second non-zero overlapped area, where said first scan line overlaps said second drain and said second region.

14. The method according to claim 13, further comprising a step of:

forming a storage capacitance line on the TFT substrate, wherein the storage capacitance line is electrically connected to the third TFT, and a distance between the storage capacitance line and the first scan line is longer than a distance between the storage capacitance line and the second scan line, wherein the storage capacitance line is disposed between the pixel electrode and the second scan line.

15. The method according to claim 14, wherein the distance between the storage capacitance line and the second scan line ranges from 4 μm to 20 μm.

16. The method according to claim 14, wherein the storage capacitance line has at least one electrical extension overlapping an edge of the pixel electrode along the data line.

17. The method according to claim 14, further comprising a step of:

forming a patterned metal layer on the thin-film transistor (TFT) substrate and opposite to the storage capacitance line, wherein a first portion of the patterned metal layer is electrically connected to the first region to form a first storage capacitor together with the storage capacitance line, a second portion of the patterned metal layer is electrically connected to the second region and the third TFT to form a second storage capacitor together with the storage capacitance line, and a third portion of the patterned metal layer is electrically connected to the third TFT to form a first auxiliary capacitor together with the storage capacitance line and to form a second auxiliary capacitor together with the first region.

18. The method according to claim 17, wherein region forming ratios of the first region to the second region of the first sub-pixel satisfy the formula (3):

$$C_{st1}/C_{lc1} > C_{st2}/C_{lc2} \qquad (3),$$

wherein $C_{st1}$ denotes the first storage capacitor, $C_{st2}$ denotes the second storage capacitor, $C_{lc1}$ denotes the first liquid crystal capacitor, and $C_{lc2}$ denotes the second liquid crystal capacitor.

* * * * *